(12) United States Patent
Ohno

(10) Patent No.: US 7,603,852 B2
(45) Date of Patent: Oct. 20, 2009

(54) EXHAUST GAS PURIFICATION APPARATUS

(75) Inventor: Kazushige Ohno, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 55 days.

(21) Appl. No.: 11/363,173

(22) Filed: Feb. 28, 2006

(65) Prior Publication Data

US 2009/0113879 A1 May 7, 2009

Related U.S. Application Data

(63) Continuation of application No. PCT/JP2005/012526, filed on Jun. 30, 2005.

(30) Foreign Application Priority Data

Jun. 30, 2004 (JP) ............................. 2004-194407

(51) Int. Cl.
*F01N 3/00* (2006.01)
(52) U.S. Cl. .................. 60/297; 60/295; 60/299; 60/311; 55/282.3; 55/385.3; 55/524; 55/DIG. 10; 55/DIG. 30
(58) Field of Classification Search ............ 60/297, 60/311, 295, 299; 55/DIG. 10, DIG. 30, 55/282.3, 385.3, 523, 524
See application file for complete search history.

(56) References Cited

U.S. PATENT DOCUMENTS

| | | | | |
|---|---|---|---|---|
| 4,205,971 A | * | 6/1980 | Abthoff et al. | 55/330 |
| 4,326,378 A | * | 4/1982 | Sweeney | 60/311 |
| 4,857,089 A | * | 8/1989 | Kitagawa et al. | 55/523 |
| 5,089,237 A | * | 2/1992 | Schuster et al. | 422/180 |
| 5,758,496 A | * | 6/1998 | Rao et al. | 60/295 |
| 5,939,354 A | * | 8/1999 | Golden | 502/400 |
| 6,827,754 B2 | * | 12/2004 | Suwabe et al. | 55/523 |
| 6,946,013 B2 | * | 9/2005 | Alward et al. | 55/523 |
| 7,210,285 B2 | * | 5/2007 | Sato et al | 60/295 |
| 2007/0148402 A1 | | 6/2007 | Ohno et al. | |
| 2007/0220871 A1 | * | 9/2007 | Zuberi et al. | 60/299 |

(Continued)

FOREIGN PATENT DOCUMENTS

JP 06-288224 10/1994

(Continued)

OTHER PUBLICATIONS

English Translation—PCT International Preliminary Report on Patentability re PCT/JP2005/012526.

(Continued)

*Primary Examiner*—Binh Q Tran
(74) *Attorney, Agent, or Firm*—Finnegan, Henderson, Farabow, Garrett & Dunner, L.L.P.

(57) ABSTRACT

An exhaust gas purification apparatus 10 includes an engine 20, a manifold 22 connected to the engine 20 and through which exhaust gas generated by burning fuel flows, and a casing 26 connected to the manifold 22 and holding a honeycomb filter 30 with a catalyst carried thereon. In the exhaust gas purification apparatus 10, the honeycomb filter 30 is disposed in a position such that the length of an exhaust gas route between the uppermost upstream portion of the manifold 22 through which exhaust gas flows and the head portion of the honeycomb filter 30 is about 1 m or less. The honeycomb filter 30 has a porosity of about 70% or more.

8 Claims, 5 Drawing Sheets

U.S. PATENT DOCUMENTS

| | | |
|---|---|---|
| 2007/0289275 A1 | 12/2007 | Ohno et al. |
| 2008/0176013 A1 | 7/2008 | Ohno et al. |
| 2008/0254254 A1 | 10/2008 | Ohno et al. |
| 2008/0276586 A1 | 11/2008 | Oya et al. |
| 2008/0289307 A1 | 11/2008 | Ogyu et al. |
| 2008/0295470 A1 | 12/2008 | Ogyu et al. |

FOREIGN PATENT DOCUMENTS

| | | |
|---|---|---|
| JP | 07-127434 | 5/1995 |
| JP | 2000-145430 | 5/2000 |
| JP | 2004-162544 | 6/2004 |
| KR | 2002-0070363 A | 9/2002 |
| WO | WO 01/45828 | 6/2001 |

OTHER PUBLICATIONS

U.S. Appl. No. 11/855,892.
U.S. Appl. No. 11/927,134.

* cited by examiner (a)

(b)

(c)

EXHAUST GAS PURIFICATION APPARATUS

CROSS-REFERENCE TO THE RELATED APPLICATIONS

This application is a continuation application of International Application No. PCT/JP2005/012526, filed on Jun. 30, 2005.

BACKGROUND OF THE INVENTION

1. Field of the Invention

The present invention relates to an exhaust gas purification apparatus.

2. Description of the Prior Art

Hitherto, as an exhaust gas purification apparatus, an apparatus in which a position of a diesel particulate filter (hereinafter, referred to as "DPF") for capturing particulate materials is devised has been proposed. For example, Japanese Patent Unexamined Publication No. JP-A 2000-145430 describes an apparatus in which a DPF is disposed in a position within 1 m distance from the downstream of an engine, the DPF is allowed to capture particulate materials and the captured particulate materials are burned by the use of exhaust heat from the engine to regenerate the DPF. The contents of JP-A 2000-145430 are incorporated herein by reference in their entirety.

SUMMARY OF THE INVENTION

An exhaust gas purification apparatus of the present invention purifies exhaust gas exhausted from an internal combustion engine and includes: a connecting tube connected to the internal combustion engine and through which the exhaust gas flows; and a purification filter having a porosity of about 70% or more, carrying a catalyst thereon, and burning particulate materials in the exhaust gas flowing through the connecting tube by using the catalyst so as to purify the exhaust gas. The purification filter is disposed in a position such that a length of the connecting tube from the internal combustion engine is about 1 m or less.

In the exhaust gas purification apparatus of the invention, the purification filter preferably has a porosity of about 95% or less.

In the exhaust gas purification apparatus of the invention, it is preferable that the purification filter has a plurality of through holes arranged in parallel along a longitudinal direction of the purification filter, and that alternate end faces of the through holes are sealed.

In the exhaust gas purification apparatus of the invention, it is preferable that a plurality of through holes are provided in such a manner in which a through hole one end of which is sealed and another end of which is open and a through hole one end of which is open and another end of which is sealed are arranged alternately.

In the exhaust gas purification apparatus of the invention, it is preferable that the purification filter carries the catalyst inside a wall through which exhaust gas passes, and that space for which the particulate materials enter is formed inside the wall.

In the exhaust gas purification apparatus of the invention, the purification filter is preferably formed by laminating in a longitudinal direction two or more plate-like members provided with a plurality of through holes in such a manner in which the through holes are communicated with each other.

In the exhaust gas purification apparatus of the invention, the purification filter is preferably formed mainly of one or more materials selected from an inorganic fiber and an inorganic foam.

In the exhaust gas purification apparatus of the invention, the catalyst preferably includes oxide.

In the exhaust gas purification apparatus of the invention, the oxide preferably has a perovskite structure.

DETAILED DESCRIPTION OF THE PREFERRED EMBODIMENTS

Figure 1:
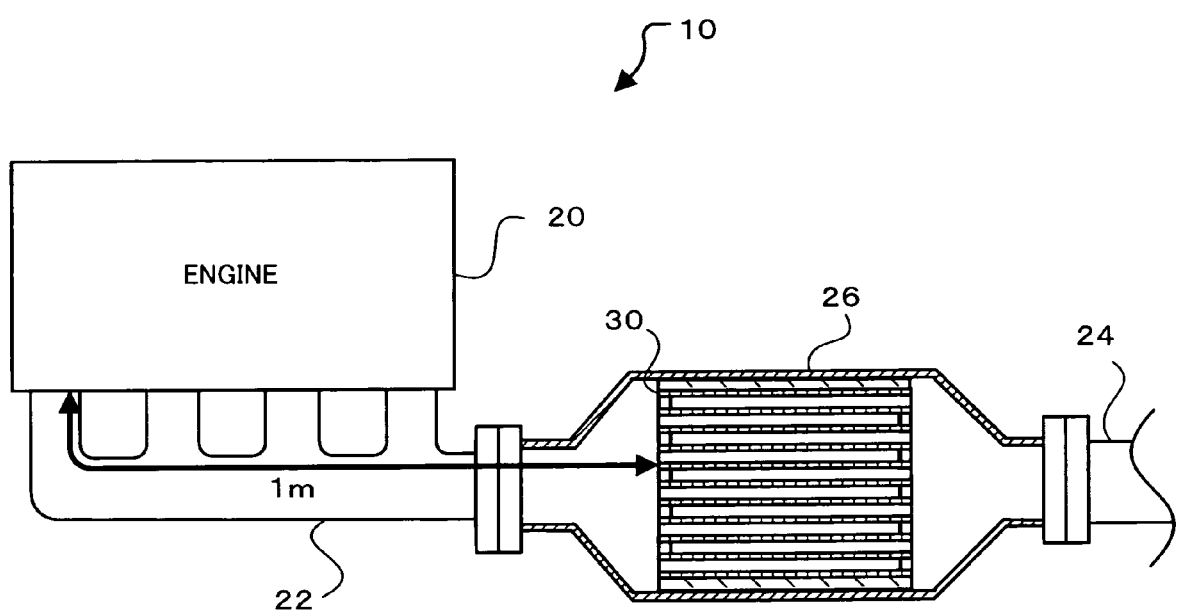
FIG. 1 schematically illustrates a configuration of an exhaust gas purification apparatus 10 in accordance with an exemplary embodiment.

An exhaust gas purification apparatus of the present invention purifies exhaust gas exhausted from an internal combustion engine and includes: a connecting tube connected to the internal combustion engine and through which the exhaust gas flows; and a purification filter having a porosity of about 70% or more, carrying a catalyst thereon, and burning particulate materials in the exhaust gas flowing through the connecting tube by using the catalyst so as to purify the exhaust gas. The purification filter is disposed in a position such that a length of the connecting tube from the internal combustion engine is about 1 m or less.

In the exhaust gas purification apparatus, since the purification filter is disposed in a position such that the length of the connecting tube from the internal combustion engine is about 1 m or less, the exhaust gas is not deprived of heat by the connecting tube, and the like, and reaches the purification filter at high temperature. Furthermore, since the porosity of the purification filter is as large as about 70% or more, particulate materials captured by the purification filter are easily bought into contact with a catalyst carried on the purification filter. As a result, the purification filter with the catalyst carried thereon is rapidly warmed to exhibit a catalytic function. Moreover, since particulate materials and catalyst are brought into contact with each other easily, many particulate materials are burned efficiently. Herein, "the length of the connecting tube from the internal combustion engine" denotes the length between the uppermost upstream portion of the connecting tube through which exhaust gas flows and the head portion of the purification filter. The porosity of the purification filter after the catalyst is carried thereon is preferably about 70% or more, and more preferably about 80% or more.

In the exhaust gas purification apparatus of the present invention, it is preferable that the purification filter has a porosity of about 95% or less. The porosity of more than about 95% is not preferable because materials constituting a wall of the purification filter are decreased and thus the strength is reduced.

In the exhaust gas purification apparatus of the present invention, the purification filter may have a plurality of through holes arranged in parallel along a longitudinal direction of the purification filter, and alternate end faces of the through holes may be sealed.

In the exhaust gas purification apparatus of the present invention, the purification filter carries the catalyst inside a wall through which exhaust gas passes, and space may be formed inside the wall to allow the particulate materials to enter. This can enhance the contact potential between the particulate materials and the catalyst and thus can enhance the regenerating efficiency as compared with the case where particulate materials are captured only by the surface with the catalyst carried thereon.

In the exhaust gas purification apparatus of the present invention, the purification filter may be formed by laminating two or more plate-like members provided with a plurality of through holes in a longitudinal direction in such a manner in which the through holes are communicated with each other. Even if the temperature difference occurs in the longitudinal direction of the purification filter due to combustion heat of the particulate materials and thermal stress is applied, laminated plate-like members relax the stress each other. Therefore, damage by thermal stress does not easily occur as compared with the filter obtained by integration molding in the longitudinal direction.

In the exhaust gas purification apparatus of the present invention, the purification filter may be formed mainly of one or more materials selected from an inorganic fiber and an inorganic foam. Thus, it is possible to realize a purification filter having a porosity of about 70% or more by the use of the inorganic fibers and/or the inorganic foam. Herein, an example of the inorganic fiber may include metal fiber, and ceramic fiber. An example of the metal fiber may include one, or two or more fibers selected from copper, iron (chromium stainless, chromium-nickel stainless, etc.) and aluminum fibers. An example of the ceramic fiber may include one, or two or more fibers selected from oxide fibers such as alumina, silica, titania, zirconia, and silica-alumina fibers and carbide fibers such as silicon carbide fiber. The inorganic foam may be, for example, metal foam or ceramic foam. Among them, metal foam is preferable because of its high strength. An example of the metal foam may include one, or two or more foams selected from, for example, copper, iron (chromium stainless, chromium-nickel stainless, etc.) and aluminum foams. An example of the ceramic foam may include one, or two or more foams selected from alumina foam, silica foam, and silicon carbide foam.

In the exhaust gas purification apparatus of the present invention, the catalyst is not particularly limited, but may be, for example, noble metal, or oxide. An example of the noble metal may include one, or two or more selected from platinum, palladium and rhodium. An example of oxide may include oxide having a perovskite structure ($LaCoO_3$, $LaMnO_3$, and the like) and $CeO_2$. Among them, oxide having a perovskite structure is preferable. Thus, it is possible to burn particulate materials without using a noble metal (such as platinum) that is rare element. An example of oxide having a perovskite structure may include one, or two or more elements having a perovskite structure (general formula: $ABO_3$) in which A site is selected from La, Y, Ce, and the like (among them, La is preferable) and one, or two or more elements having a perovskite structure (general formula: $ABO_3$) in which B site is selected from Fe, Co, Ni, Mn, and the like. Oxide having the general formula in which a part of element at A site may be substituted with K, Sr, Ag, and the like, and may be, for example, $La_{0.75}K_{0.25}CoO_3$.

Best modes for carrying out the present invention will be described with reference to drawings.

FIG. 1 is schematically illustrates a configuration of an exhaust gas purification apparatus 10 in accordance with an exemplary embodiment. The exhaust gas purification apparatus 10 includes an engine 20, a manifold 22 connected to the engine 20 and through which exhaust gas generated by burning fuel flows, a casing 26 connected to the manifold 22 and holding a honeycomb filter 30 with a catalyst carried thereon, and an exhaust gas tube 24 connected to the casing 26 and exhausting a purified exhaust gas, and the exhaust gas purification apparatus 10 is mounted on a vehicle. In the exhaust gas purification apparatus 10, as shown in FIG. 1, the honeycomb filter 30 is disposed in a position such that the length of an exhaust gas route from the engine 20 is about 1 m or less, that is, in a position such that the length of an exhaust gas route from the uppermost upstream portion of the manifold 22 to the head portion of the honeycomb filter 30 is about 1 m or less.

The engine 20 is configured as a diesel engine (internal combustion engine) that generates driving force by injecting hydrocarbon fuel such as light oil into the air compressed by a piston for combustion. Exhaust gas from the engine 20 contains nitrogen oxide (NOx), hydrocarbon (HC) and carbon monoxide (CO), and also contains particulate material (hereinafter, referred to as "PM") generated from carbon contained in the fuel.

Figure 2:
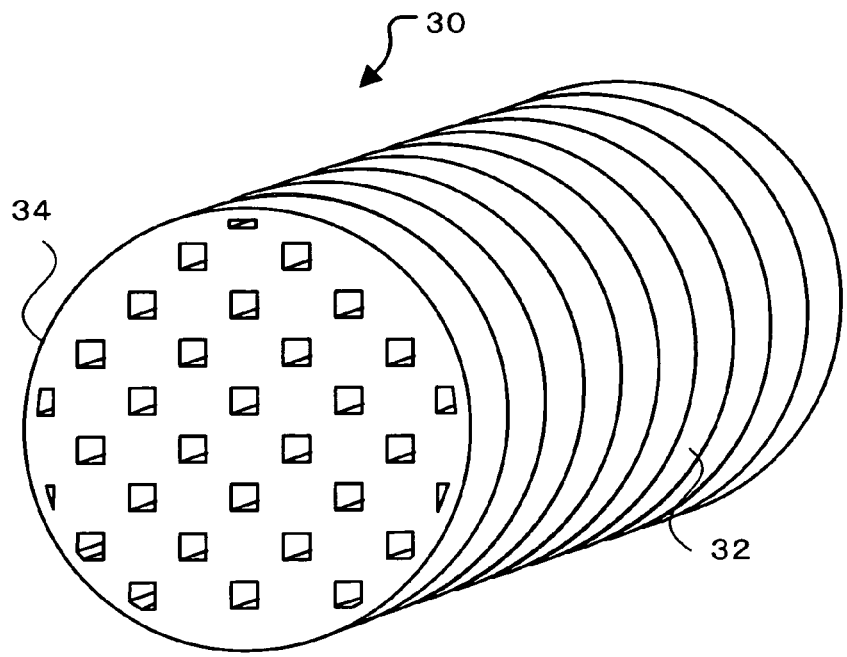
FIG. 2 illustrates a honeycomb filter 30 in accordance with the exemplary embodiment.
Figure 2:
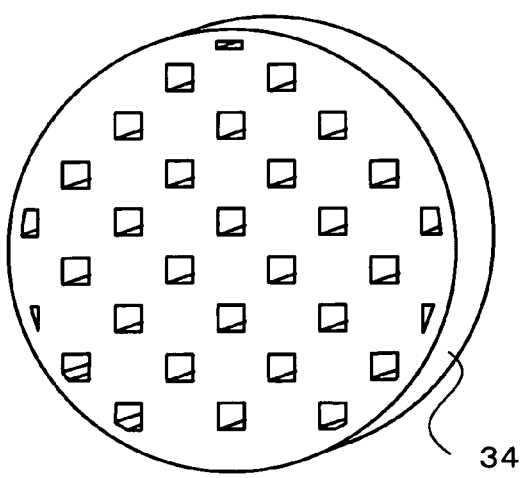
Figure 2:
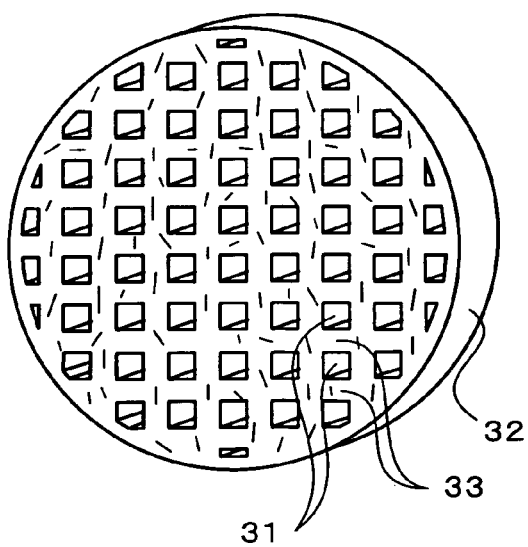
Figure 3:
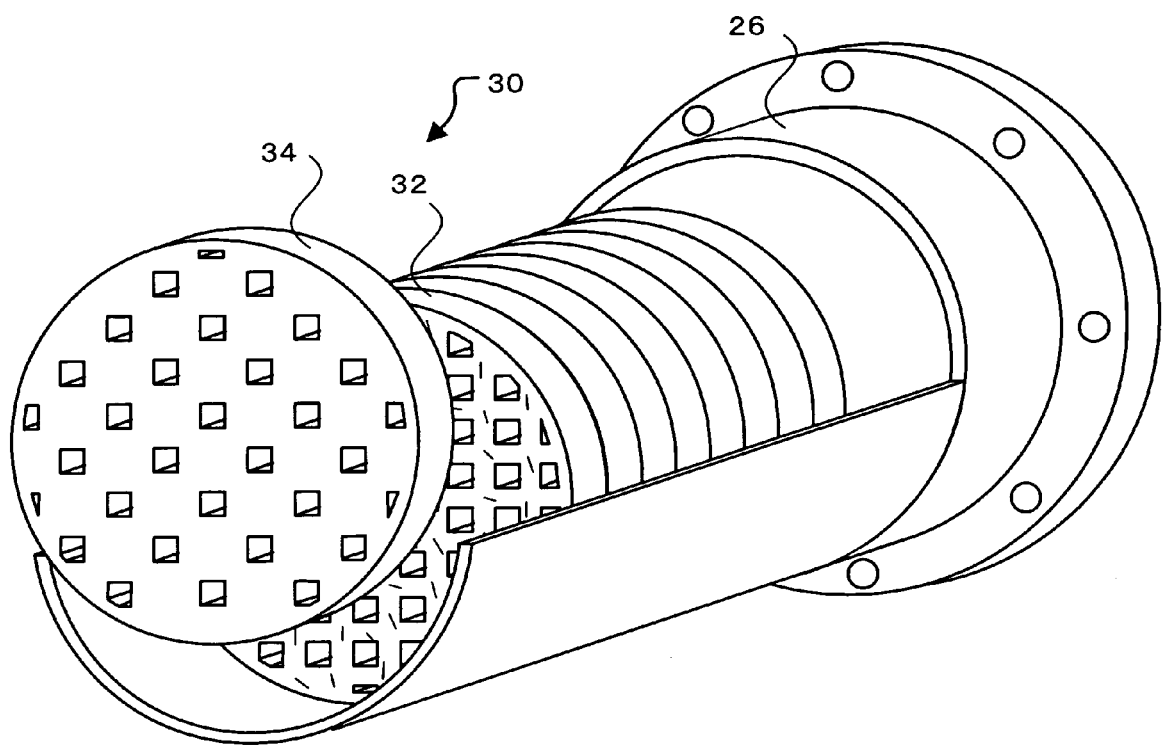
FIG. 3 illustrates the honeycomb filter 30 in accordance with the exemplary embodiment.

The honeycomb filter 30 is formed mainly of inorganic fibers and removes PMs contained in exhaust gas from the engine 20. As shown in FIGS. 2 and 3, this honeycomb filter 30 is formed by laminating in a longitudinal direction two or more disk-shaped plate-like members 32 provided with a plurality of through holes 31 in such a manner in which the through holes 31 communicate with each other, placing metallic end plate-like members 34 on the both ends of the laminated plate-like members 32, applying pressure in the laminating direction so as to fix the laminated product in the casing 26. With these end plate-like members 34, the end faces of the through holes 31 communicating to each other of the laminated plate-like members 32 are sealed alternately. Exhaust gas flows into the through holes 31 that are open at the upstream side of the honeycomb filter 30, passes through a wall portion 33, then moves to the through holes 31 that are open at the downstream side, flows through the through holes 31 and flows out from the honeycomb filter 30. Herein, PMs contained in the exhaust gas are captured when the exhaust gas passes through the wall portion 33. Greater heat or pressure may be applied to the end faces of the honeycomb filter 30 by the exhaust gas as compared with the inside of the honeycomb filter 30. However, since the end plate-like members 34 are made of metal, the honeycomb filter 30 can be protected from being damaged. It is preferable that the thicknesses of the plate-like member 32 and the end plate-like member 34 are in a range of about 0.1 to 10 mm. One end plate-like member 34 may be disposed on each of the both ends of the laminated plate-like members 32 or several end plate-like members 34 may be disposed on each of the both ends. Herein, the end plate-like member 34 is made of metal, however, it may be formed of the same material as that of the plate-like member 32. Herein, honeycomb filter 30 may be obtained by laminating the plate-like members 32 but an integrally-molded honeycomb filter may be used.

This honeycomb filter 30 is formed so that the porosity after carriage of a catalyst is in a range of about 70% to 95%. Therefore, it is preferable that the porosity measured prior to carriage of the catalyst is at least about 70% or more, and about 97% or less. Furthermore, it is preferable that the apparent density of this honeycomb filter 30 is preferably in a range of about 0.05 to 1.00 g/cm$^3$, more preferably in a range of about 0.10 to 0.50 g/cm$^3$.

The size of the through hole 31 formed in the honeycomb filter 30 is preferably in a range of about 1.4×1.4 mm to 16×16 mm. The thickness (wall thickness) of the wall portion 33 between the adjoining through holes 12 is preferably in a range of about 0.2 to 10.0 mm, more preferably in a range of about 0.3 to 6.0 mm. The wall thickness of about 0.2 mm or more is preferable because leakage of PMs is prevented the capture efficiency is adequately maintained. The wall thickness of about 10.0 mm or less is preferable because exhaust gas easily pass through the wall portion 33, keeping the pressure loss from being high. The number of through holes 31 per unit cross-sectional area (cell density) is preferably in a range of about 0.16 to 62 holes/cm$^2$ (about 1.0 to 400 cpsi) and more preferably in a range of about 0.62 to 31 holes/cm$^2$ (about 4 to 200 cpsi). The number of through holes of about 0.16 holes/cm$^2$ or more is preferable because an area of the wall that is brought into contact with exhaust gas inside the honeycomb filter 30 is relatively large. The number of through holes of about 62 holes/cm$^2$ or less is preferable because the pressure loss is kept from being high and production of the honeycomb filter 30 is relatively easy. The shape of the through hole may be rectangle or triangle or hexagon.

The plate-like member 32 of the honeycomb filter 30 is formed mainly of inorganic fibers. The length of this inorganic fiber is preferably in a range of about 0.1 to 300 µm and more preferably in a range of about 0.5 to 50 µm. The diameter of the inorganic fiber is preferably in a range of about 1 to 30 µm and more preferably in a range of about 2 to 10 µm. Furthermore, this plate-like member 32 includes an inorganic binder for binding inorganic fibers together. An example of the inorganic binder may include one, or two or more inorganic binders selected from inorganic glass such as silica glass, silica alkaline glass and boric silica glass and the like, and sols such as alumina sol, silica sol, titania sol, and the like. The amount of the inorganic binders as a solid amount contained in the honeycomb filter 30 is preferably in a range of about 5 to 50% by weight and more preferably in a range of about 10 to 40% by weight. The content of binders of about 5% or more by weight is preferable because the strength of the honeycomb filter 30 is maintained. The content of binders of about 50% or less by weight is preferable because a honeycomb filter having high porosity is easily produced.

It is preferable that many inorganic fibers contained in the plate-like member 32 are oriented along the surface perpendicular to the direction in which the through holes 31 are formed. This configuration easily forms space in which PMs contained in exhaust gas enter. In addition, exhaust gas can easily pass through the wall portion 33, and it is possible to reduce the initial pressure loss and to allow PMs contained in exhaust gas to enter the inside of the wall portion 33 to capture PMs.

The plate-like member 32 may further include inorganic particles in addition to inorganic fibers. The inorganic particles may be metal particles or ceramic particles. An example of the metal particles may include one, or two or more particles selected from metal silicon, aluminum, and the like. An example of the ceramic particles may include one, or two or more particles selected from oxide particles such as alumina, silica, silica-alumina, zirconia, cordierite, and mullite.

LaCoO$_3$ having a perovskite structure as a catalyst is carried on the honeycomb filter 30. The amount of the carried exhaust gas conversion catalyst is preferably in a range of about 10 to 100 g/L of weight of the catalyst per unit volume of the honeycomb filter 30. Herein, the honeycomb filter 30 with the catalyst carried thereon may be produced by using inorganic fibers with the catalyst carried thereon as a raw material, or may be produced by using the plate-like member 32 and the end plate-like member 34 with the catalyst carried thereon, or may be produced by allowing the honeycomb filter 30 that was produced beforehand to carry the catalyst thereon.

The honeycomb filter 30 may be produced by laminating the plate-like member 32 formed mainly of inorganic foams instead of the above-mentioned plate-like member 32 containing inorganic fibers. This inorganic foam may be, for example, a ceramic foam or a metal foam. Among them, metal foam is preferable because of its high strength. An example of the ceramic foam may include one, or two or more foams selected from alumina foam, silica foam and silicon carbide foam. An example of the metal foam may include one, or two or more foams selected from copper, iron (such as stainless), aluminum foams, and the like. The porosity of the honeycomb filter 30 formed of inorganic foams after carriage of the catalyst is preferably in a range of about 70% to 95%. Therefore, it is preferable that the porosity measured prior to carriage of the catalyst is at least about 70% or more, and about 97% or less.

(1) Method of Manufacturing Honeycomb Filter Containing Inorganic Fibers

One example of a method of manufacturing a honeycomb filter containing inorganic fibers will be described. The procedure of the method disperses about 5 to 100 g of inorganic fibers (such as alumina fibers) into 1 L of water, and adds about 10 to 40 parts by weight of inorganic binders (such as silica sol) and about 1 to 10 parts by weight of organic binders (such as acrylic resin) with respect to 100 parts by weight of inorganic fibers to give a mixture. According to need, the procedure adds a small amount of coagulant such as aluminum sulfate, flocculant such as polyacrylamide to the mixture and stirs the mixture sufficiently to prepare a slurry. This slurry is made into form of a plate by using a mesh provided with holes having a predetermined shape (such as square-shape) at predetermined intervals and the obtained object is dried at about 100 to 200° C. to produce a plate-like member 32 shown in FIG. 2(c). The shape of the plate-like member 32 containing inorganic fibers can be changed by applying pressure. The laminated plate-like members 32 are compressed so as to adjust the porosity and thickness according to need. Herein, for example, when the honeycomb filter 30 is integrally-molded by extrusion molding using a mold, many inorganic fibers are oriented in the direction of extrusion (in the direction in which through holes 31 are formed). However, in the case of production by processing the slurry into form of a plate, as shown in FIG. 2, many inorganic fibers are oriented along the surface perpendicular to the direction in which the through holes 31 are formed. Therefore, exhaust gas can easily flow through the wall portion 33. Then, the end plate-like member 34 is produced by forming predetermined shaped holes on a metal plate in such a manner in which alternate end faces of the through holes 31 are sealed (see FIG. 2(b)).

Then, the plate-like member 32 is allowed to carry the catalyst. The procedure firstly prepares a solution (for example, slurry or sol) containing a catalyst, soaks the plate-like member 32 in this solution, then lifts the member up, and removes excessive solution remaining in the through holes 31, etc. by suction, followed by drying at about 80 to 200° C. and firing at about 500 to 700° C. Thus, the plate-like member 32 with the catalyst carried thereon can be obtained. Herein, the solution containing the catalyst may be a slurry of the catalyst or may be a slurry of oxide (such as alumina) with the catalyst carried thereon. The amount of the carried exhaust gas purification catalyst is appropriately selected depending upon the types or combination of the catalyst. Finally, plate-like member 32 and the end plate-like member 34 are physically laminated to give the honeycomb filter 30. As shown in FIG. 3, the procedure laminates several end plate-like members 34 in such a manner in which the through holes 31 are communicated with each other and inserts the laminated end plate-like members 34 into a metal casing 26, then similarly laminates a predetermined number of the plate-like members 32 and inserts the laminated plate-like members 32 into the casing 26, and further inserts several end plate-like members 34 into the casing 26. The procedure applies pressure to the laminate by press in the laminated direction so as to be fixed by providing pressure metal fittings. Thus, the honeycomb filter 30 is produced. The laminated end plate-like members 34 may be adhesively fixed to each other with an adhesive material. For the convenience of explanation, the casing 26 shown in FIG. 3 shows only a lower part among an upper part and a lower part obtained by cutting the hollow cylindrical shaped casing 26.

(2) Method of Manufacturing Honeycomb Filter Formed of Inorganic Foams

1. Method of Manufacturing Honeycomb Filter Formed of Ceramic Foams

One example of a method of manufacturing the honeycomb filter formed of ceramic foams among high porosity inorganic foams will be described. The procedure of the method produces the plate-like member 32 having the shapes mentioned in the above (1) by forming through holes 31 by cutting work in a high porosity ceramic foam plate (for example, ceramic foam manufactured by BRIDGESTONE, etc.) formed mainly of ceramic materials (for example, cordierite, alumina, mullite, silicon carbide and aluminum titanate, and the like). The procedure then allows the plurality of the obtained plate-like members 32 mentioned in the above (1) to carry the catalyst and to laminate them by the method mentioned in the above (1) to give a honeycomb filter 30. As the end plate-like member 34, the metal plate mentioned in the above (1) is used.

2. Method of Manufacturing Honeycomb Filter Formed of Metal Foams

One example of a method of manufacturing the honeycomb filter formed of metal foams among high porosity inorganic foams will be described. The procedure of the method produces the plate-like member 32 having the shapes mentioned in the above (1) by forming through holes 31 by laser beam machining in a high porosity metal plate (for example, Selmet, Sumitomo Metal Industries, etc.) formed mainly of metal. The procedure then allows the plurality of the obtained plate-like members 32 mentioned in the above (1) to carry the catalyst and laminates the plate like members 32 with the catalyst by the method mentioned in the above (1) to give a honeycomb filter 30. The shape of the plate-like member 32 formed of metal foams can be changed by applying pressure. The laminated plate-like members 32 are compressed so as to adjust the porosity and thickness if necessary. As the end plate-like member 34, the metal plate mentioned in the above (1) is used.

Figure 4:
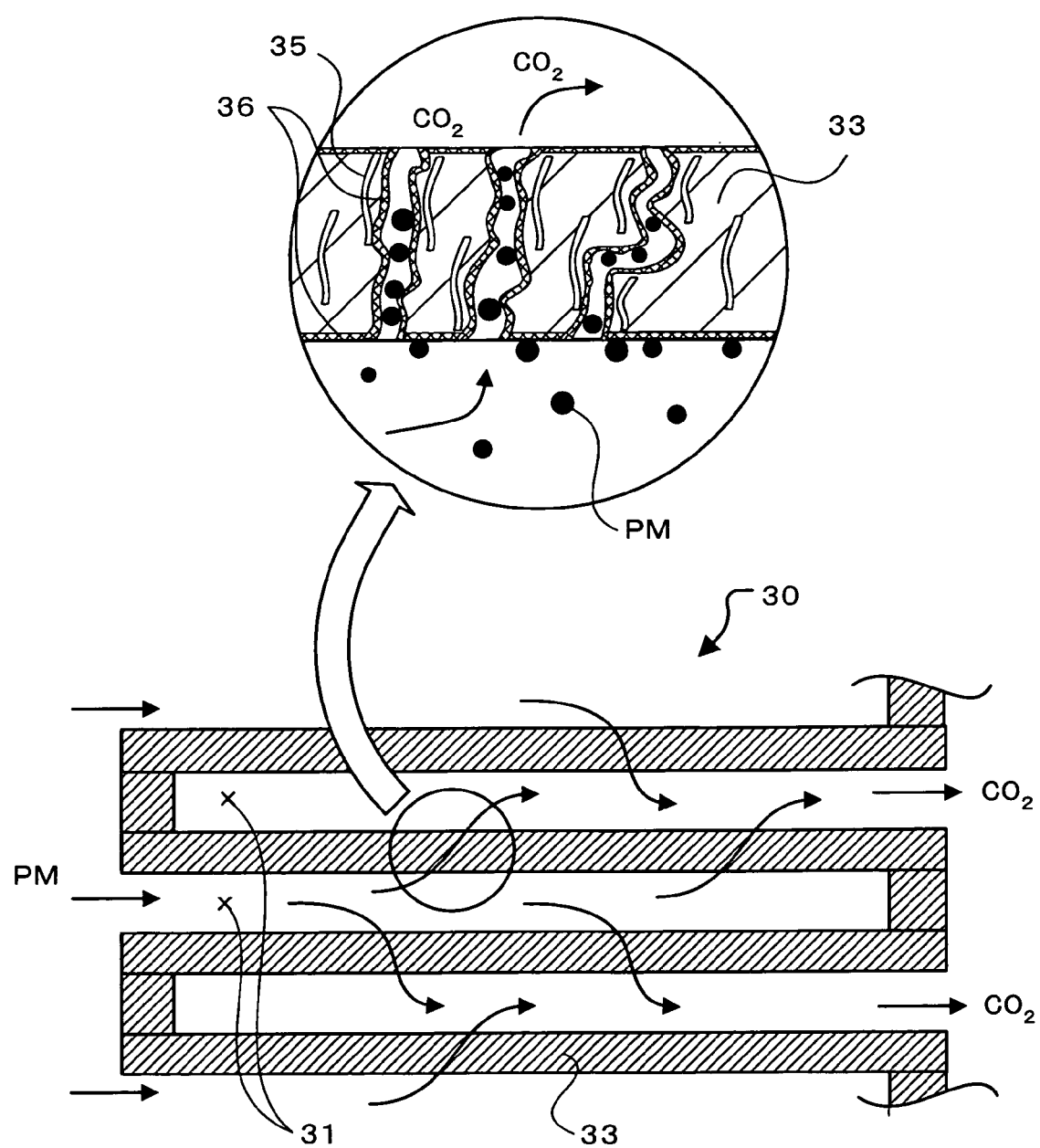
FIG. 4 schematically illustrates that particulate materials are captured and removed by the exhaust gas purification apparatus 10 in accordance with the exemplary embodiment.

Next, the operation of the exhaust gas purification apparatus 10 of this exemplary embodiment will be described with reference to FIG. 4. FIG. 4 schematically illustrates that PMs are captured and removed by the exhaust gas purification apparatus 10. Firstly, when an engine 20 is started, the engine 20 generates driving force by injecting fuel into the air compressed by a piston for combustion. At this time, exhaust gas containing PMs is exhausted from the engine 20 to a manifold 22 and flows into the honeycomb filter 30. The honeycomb filter 30 is provided with space into which PMs enter, PMs contained in exhaust gas is allowed to enter the inside of the wall portion 33 with the catalyst 36 carried thereon and captured. It is thought that when many inorganic fibers 35 contained in the honeycomb filter 30 are oriented along the surface perpendicular to the direction in which through holes 31 are formed, PMs enter the deep inside of the wall portion 33 and can be captured. Since the honeycomb filter 30 has a high porosity and small heat capacity, the temperature is rapidly increased due to exhaust heat. Then, the honeycomb filter 30 is disposed in a position at about 1 m distance from the engine 20, so that thermal loss is low and a temperature at which the catalyst works sufficiently (for example, 350° C. or more) is obtained due to the exhaust heat. At this time, when PMs are brought into contact with the catalyst 36 carried on the inside of the wall portion 33 of the honeycomb filter 30, these PMs are rapidly burned. As a result, in the honeycomb filter 30, since PMs are not easily deposited, the frequency of forced regeneration (injection of an excessive amount of fuel, etc.) is reduced.

In the exhaust gas purification apparatus 10 described above in detail, the honeycomb filter 30 with the catalyst 36 carried thereon is rapidly warmed and a catalytic function can be exhibited. Moreover, since catalyst and PMs are brought into contact with each other easily, many PMs can be burned efficiently. Consequently, it is possible to regenerate the honeycomb filter 30 easily. Furthermore, the honeycomb filter 30 has a porosity of about 95% or less, it is possible to prevent the strength from being deteriorated. Furthermore, as compared with the case where PMs are captured only by a wall surface with the catalyst carried thereon, the contact potential between PMs and the catalyst 36 is enhanced and thus the regenerating efficiency can be enhanced. In addition, even if the temperature difference occurs and thermal stress is applied in the longitudinal direction of the honeycomb filter 30 due to the combustion heat of PMs, laminated plate-like members 32 relax the stress each other. Therefore, damage by thermal stress does not easily occur as compared with a filter obtained by integration molding in the longitudinal direction. Since the honeycomb filter 30 has a high porosity and small heat capacity, the temperature is rapidly increased so that PMs can be burned. Furthermore, since the catalyst 36 carried on the honeycomb filter 30 is oxide having a perovskite structure, particulate materials can be burned without using a noble metal (such as platinum) that is rare element.

Needless to say, the present invention is not limited to the above-mentioned exemplary embodiments but various embodiments within the scope of the technical field of the present invention can be carried out.

Figure 5:
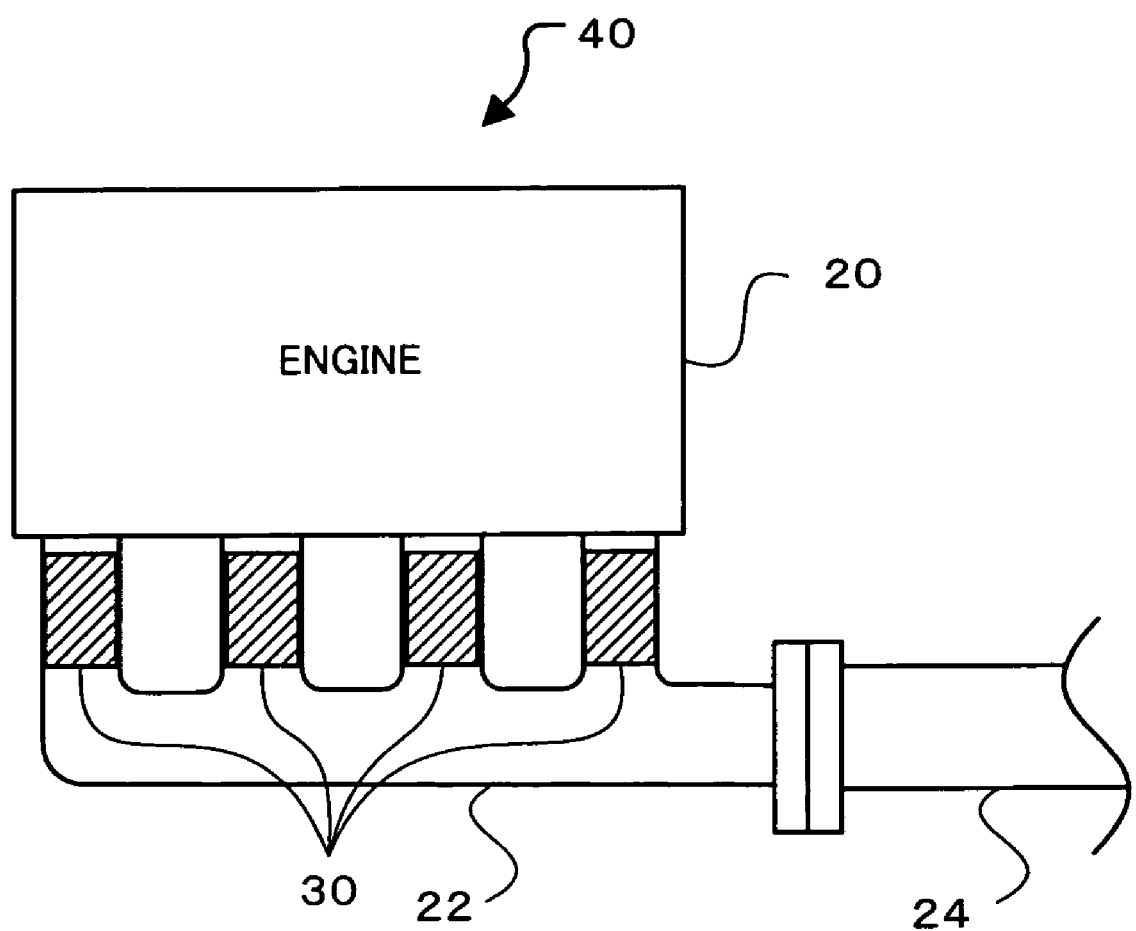
FIG. 5 schematically illustrates a configuration of an exhaust gas purification apparatus 40 in accordance with another exemplary embodiment.

The above-mentioned exemplary embodiment described the exhaust gas purification apparatus 10 in which the casing 26 holding the honeycomb filter 30 is connected to the manifold 22. However, as shown in FIG. 5, an exhaust gas purification apparatus 40 may be configured by disposing the honeycomb filters 30 inside the manifold 22. This configuration makes it possible to use exhaust heat effectively and to regenerate the filter easily. As long as the length of the exhaust gas path from the engine 20 to the head portion of the honeycomb filter 30 is set to about 1 m or less, types of connecting tubes (manifold 22, exhaust gas tube 24 and casing 26, etc.) and order of connection may be changed.

In the above-mentioned exemplary embodiment, the exhaust gas purification apparatus 10 is mounted on a vehicle.

However, it may be mounted on, for example, train, ship, aircraft, and the like, or may be applied to a generator and the like using the engine 20.

EXAMPLES

Hereinafter, examples of an exhaust gas purification apparatus 10 using a honeycomb filter 30 will be described as examples.

Example 1

A honeycomb filter 30 including alumina fibers (average diameter: 5 μm, average length: 300 μm) as inorganic fibers was produced. The procedure dispersed 10 g of alumina fibers to 1 L of water, added 5% by weight of silica sol and 3% by weight of acrylic latex as organic binders to alumina fibers, and further added a small amount of aluminum sulfate and polyacrylamide to give a mixture. The procedure sufficiently stirred the mixture to prepare a slurry. This slurry was made into form of a plate by using a mesh provided with square-shaped holes at predetermined intervals and the obtained object was dried at 150° C. to provide a plate-like member 32 having a diameter of 143.8 mm, a thickness of 1 mm, a through hole size of 4.5×4.5 mm, thickness of a wall portion 33 of 2 mm and a cell density of 2.4 cells/cm² (15.2 cpsi). Furthermore, an end plate-like member 34 was produced by forming through holes 31 on a metal plate made of nickel chromium stainless having a diameter of 143.8 nm and a thickness of 1.0 mm in such a manner in which both ends of alternate through holes 31 are sealed.

Next, the procedure mixed 0.01 mol of $La(NO_3)_3.6H_2O$, 0.01 mol of $Co(OCOCH_3)_2.4H_2O$ and 0.024 mol of $C_6H_8O_7.H_2O$ (citric acid) into 20 ml of ethanol solvent to give a mixture. The procedure stirred the mixture to prepare a $LaCoO_3$ precursor sol. The procedure soaked the plate-like member 32 in this sol, lifted it up and then removed excessive sols by suction, dried at 100° C. and fired at 600° C. for one hour. A perovskite structure of $LaCoO_3$ was confirmed by an X-ray diffraction method. The amount of the carried exhaust gas conversion catalyst was 30 g/L as weight of the catalyst per unit volume of the honeycomb filter 30.

Next, the procedure laminated three end plate-like members 34 in such a manner in which the through holes thereof communicate with each other and inserted the laminated members into a metallic casing 26, then similarly laminated 150 plate-like members 32 and inserted into the metallic casing 26, and further inserted three end plate-like members 34 into the metallic casing 26. Pressure is applied to the laminated product by press in the direction in which they are laminated so as to be fixed by providing pressure fixings. Thus, the honeycomb filter 30 was obtained. The porosity of the obtained honeycomb filter 30 after carriage of the catalyst thereon was 70%. The porosity was calculated according to the below mentioned Equation (1) by measuring dry weight G (g) of the honeycomb filter 30, external volume V (cm³) of the honeycomb filter 30, volume K (cm³) of the through hole 31 and true density D (g/cm³) of materials constituting the honeycomb filter 30.

$$\text{Porosity \%} = 100 \times (1 - G/((V-K) \times D)) \qquad (1)$$

Then, the produced honeycomb filter 30 with $LaCoO_3$ carried thereon was disposed in a position such that the length of the exhaust gas path from the uppermost upstream portion of the manifold 22 connected to an engine 20 to the head portion of the honeycomb filter 30 was 0.5 m. This gave honeycomb filters 30 of Example 1. For the engine 20, 2.0 L diesel engine was used. Numerical values etc. of Example 1, that is, the length from the engine 20 to the honeycomb filter 30, the porosities of the honeycomb filter 30 measured before and after carriage of the catalyst, the thickness of a wall portion 33 between the adjoining through holes 31, constituting materials of the honeycomb filter 30, an outline of the structure of the honeycomb filter 30, and the like, are shown in Table 1. Table 1 also shows contents regarding the below mentioned Examples 2 to 12.

TABLE 1

| Sample | Length from Engine (m) | Porosity of Filter (%) | Wall Thickness (mm) | Constituent Material | Structure |
|---|---|---|---|---|---|
| Example 1 | 0.5 | 70 | 2.0 | Ceramic Fiber | Laminate |
| Example 2 | 0.5 | 80 | 2.0 | Ceramic Fiber | Laminate |
| Example 3 | 0.5 | 95 | 3.0 | Ceramic Fiber | Laminate |
| Example 4 | 0.5 | 80 | 2.0 | Metal Foam | Laminate |
| Example 5 | 1.0 | 70 | 2.0 | Ceramic Fiber | Laminate |
| Example 6 | 1.0 | 80 | 2.0 | Ceramic Fiber | Laminate |
| Example 7 | 1.0 | 95 | 3.0 | Ceramic Fiber | Laminate |
| Example 8 | 1.0 | 80 | 2.0 | Metal Foam | Laminate |
| Example 9 | 1.5 | 70 | 2.0 | Ceramic Fiber | Laminate |
| Example 10 | 1.5 | 80 | 2.0 | Ceramic Fiber | Laminate |
| Example 11 | 1.5 | 95 | 3.0 | Ceramic Fiber | Laminate |
| Example 12 | 1.0 | 65 | 2.0 | Ceramic Fiber | Laminate |

Examples 2 and 3

Honeycomb filters 30 were produced by the same way as in Example 1 except for designing honeycomb filters 30 to have wall thicknesses shown in Table 1 and cell density of 2.4 cells/cm² (15.2 cpsi) and changing the compression ratios to have porosities shown in Table 1. Similar to Example 1, the honeycomb filter 30 were disposed in a position such that the length of the exhaust gas path from the uppermost upstream portion of the manifold 22 to the head portion of the honeycomb filter 30 was 0.5 m. This gave honeycomb filters 30 of Examples 2 and 3.

Example 4

The procedure of Example 4 compressed chromium-nickel stainless alloy metal foam (Selmet, Sumitomo Electric Industries, average pore size: 400 μm) by using a roller so as to have the average pore size of 80 μm, processed into a disk shape having a diameter of 143.8 mm and a thickness of 1 mm, carried out laser processing to produce a plate-like member 32 having a size of a through hole of 4.5×4.5 mm, a thickness of a wall portion 33 of 2 mm and a cell density of 2.4 cells/cm² (15.2 cpsi). Furthermore, the procedure produced the end plate-like member 34 in which through holes 31 were processed by laser in such a manner in which the alternate end faces of the through holes 31 were sealed.

Then, by the same process as in Example 1, the procedure allowed the plate-like members 32 and the end plate-like members 34 to carry $LaCoO_3$ thereon and laminated thereof to produce the honeycomb filter 30 made of metal foam. Similar to Example 1, the honeycomb filter 30 was disposed in a position such that the length of the exhaust gas path from the uppermost upstream portion of the manifold 22 to the head portion of the honeycomb filter 30 was 0.5 m. This gave honeycomb filters 30 of Example 4.

Examples 5 to 8

The honeycomb filters 30 similar to those of Examples 1 to 4 were produced and disposed in a position such that the length of the exhaust gas path from the uppermost upstream portion of the manifold 22 to the head portion of the honeycomb filter 30 was 1 m. This gave honeycomb filters 30 of Examples 5 to 8, respectively (see Table 1).

Examples 9 to 11

The honeycomb filters 30 similar to those of Examples 1 to 3 were produced and disposed in a position such that the length of the exhaust gas path from the uppermost upstream portion of the manifold 22 to the head portion of the honeycomb filter 30 was 1.5 m. This gave honeycomb filters 30 of Examples 9 to 11, respectively (see Table 1).

Example 12

A honeycomb filter 30 was produced by the same way as in Example 1 except for designing honeycomb filters 30 to have a wall thickness shown in Table 1 and changing the compression ratio so as to have a porosity of 65%. Similar to Example 5, the honeycomb filter 30 was disposed in a position such that the length of the exhaust gas path from the uppermost upstream portion of manifold 22 to the head portion of the honeycomb filter 30 was 1.0 m. This gave honeycomb filter 30 of Example 12.

[Measurement of Regeneration Rate]

With regard to Examples 1 to 12, the regeneration rates were measured. This measurement examines the amount of PMs exhausted from the engine 20 during operation being deposited on the honeycomb filter without carrying out a forced regeneration process (such as injection of an excessive amount of fuel). The operation of the engine 20 was carried out three cycles in conformity with a measurement method of 2.0 L Diesel engine automobile 10·15 mode exhaust gas measuring test. At this time, weights of the honeycomb filters 30 before and after the test were measured, respectively. Furthermore, in the downstream of the honeycomb filter 30 of each Example, a PM counter (coagulated particles counter 3022A-S, TSI) was placed for grasping the amount of PMs, which were not captured by the honeycomb filter 30 and were exhausted toward the downstream, from the number of PM particles. In all Examples, PMs did not flow toward the downstream of the honeycomb filters 30, which showed that all the capture rates were 100%. Furthermore, when the total amount of produced PMs generated in this test was examined in advance, the amount was 3.5 g. Therefore, the regeneration rate was calculated from the deposited amount of PMs with respect to the total amount of produced PMs (the difference in the weight before and after the test).

[Measurement Results]

With regard to Examples 1 to 12, the lengths of the exhaust gas route from the engine to the head portion of the honeycomb filters 30, the porosities of the honeycomb filters 30, the capture efficiencies of PMs, the deposition amounts of PMs and the regeneration rates of the honeycomb filters 30 are shown in Table 2. In Examples 1 to 8, the capture efficiencies were 100% and the regeneration rates were as high as 50% or more. In Examples 9 to 11, since the lengths from the engine to the honeycomb filter 30 was 1.5 m, the regeneration rates were lower as compared with Examples 1 to 8. In Example 12, the porosity of the honeycomb filter 30 after carriage of the catalyst 36 was less than 70% and the regeneration rate was lower as compared with Examples 1 to 8. These results showed that when the honeycomb filter 30 having the porosity of 70% or more was disposed within the 1 m distance from the engine 20, PMs were easily burned.

TABLE 2

| Sample | Length from Engine (m) | Porosity of Filter (%) | PM Capture Efficiency (%) | PM Deposited Amount (g) | Regeneration Rate (%) |
| --- | --- | --- | --- | --- | --- |
| Example 1 | 0.5 | 70 | 100 | 0.8 | 77 |
| Example 2 | 0.5 | 80 | 100 | 0.6 | 83 |
| Example 3 | 0.5 | 95 | 100 | 0.7 | 80 |
| Example 4 | 0.5 | 80 | 100 | 0.6 | 83 |
| Example 5 | 1.0 | 70 | 100 | 1.0 | 71 |
| Example 6 | 1.0 | 80 | 100 | 0.9 | 74 |
| Example 7 | 1.0 | 95 | 100 | 1.0 | 71 |
| Example 8 | 1.0 | 80 | 100 | 0.9 | 74 |
| Example 9 | 1.5 | 70 | 100 | 2.2 | 37 |
| Example 10 | 1.5 | 80 | 100 | 2.1 | 40 |
| Example 11 | 1.5 | 95 | 100 | 2.1 | 40 |
| Example 12 | 1.0 | 75 | 100 | 2.2 | 37 |

The present invention claims benefit of priority to Japanese Patent Application No. 2004-194407, filed on Jun. 30, 2004, the contents of which is incorporated by reference herein.

The invention claimed is:

1. An exhaust gas purification apparatus for purifying exhaust gas exhausted from an internal combustion engine, comprising:
a connecting tube connected to the internal combustion engine and through which the exhaust gas flows; and
a purification filter that has a porosity of about 70% or more, an apparent density in a range of 0.05 to 1.00 g/cm$^3$, carries a catalyst thereon, wherein particulate materials in the exhaust gas flowing through the connecting tube are captured in the filter and combust in the presence of the catalyst,
wherein the purification filter has a honeycomb structure having two end faces and a plurality of through holes arranged in parallel along the longitudinal direction of the purification filter, where one of two end openings of a through hole is sealed at one of the two end faces in a manner that the alternate end openings of the through holes are sealed at the end faces,
the purification filter is formed mainly of one or more materials selected from an inorganic fiber and an inorganic foam and is disposed in a position such that a length of the connecting tube from the internal combustion engine to the end face of the filter closer to the engine is about 1 m or less,
wherein the purification filter is formed by laminating in a longitudinal direction two or more plate-like members having a plurality of through holes wherein the through holes in the plate-like members are aligned to form through holes across the purification filter in the longitudinal direction.

2. The exhaust gas purification apparatus according to claim 1, wherein the purification filter has a porosity of about 95% or less.

3. The exhaust gas purification apparatus according to claim 1, wherein the purification filter carries the catalyst inside a wall through which exhaust gas passes, and space for which the particulate materials enter is formed inside the wall.

4. The exhaust gas purification apparatus according to claim 1, wherein the catalyst includes oxide.

5. The exhaust gas purification apparatus according to claim 4, wherein the oxide has a perovskite structure.

6. The exhaust gas purification apparatus according to claim 1, wherein the purification filter is formed mainly of ceramic fibers.

7. The exhaust gas purification apparatus according to claim 1, wherein the purification filter is heated only by the exhaust gas from the internal combustion engine at the engine start up.

8. The exhaust gas purification apparatus according to claim 1, wherein the plate-like member at the end face of the purification filter is made of metal.

* * * * *